(12) United States Patent
Greubel

(10) Patent No.: US 9,402,174 B2
(45) Date of Patent: Jul. 26, 2016

(54) VEHICLE DRIVER IDENTIFICATION USING PORTABLE DEVICE

(71) Applicant: HTI IP, L.L.C., Atlanta, GA (US)

(72) Inventor: Alan Paul Greubel, San Diego, CA (US)

(73) Assignee: Verizon Telematics Inc., Atlanta, GA (US)

( * ) Notice: Subject to any disclaimer, the term of this patent is extended or adjusted under 35 U.S.C. 154(b) by 582 days.

(21) Appl. No.: 13/887,409

(22) Filed: May 6, 2013

(65) Prior Publication Data

US 2014/0328248 A1 Nov. 6, 2014

(51) Int. Cl.
| H04W 8/00 | (2009.01) |
| G07B 15/02 | (2011.01) |
| G07C 5/08 | (2006.01) |

(52) U.S. Cl.
CPC .............. *H04W 8/005* (2013.01); *G07B 15/02* (2013.01); *G07C 5/0841* (2013.01)

(58) Field of Classification Search
None
See application file for complete search history.

(56) References Cited

U.S. PATENT DOCUMENTS

| 6,594,579 B1* | 7/2003 | Lowrey | G08G 1/20 340/439 |
| 6,636,790 B1* | 10/2003 | Lightner | G01M 15/102 701/31.4 |
| 6,732,031 B1* | 5/2004 | Lightner | G01M 15/102 701/31.4 |
| 8,942,885 B2* | 1/2015 | Yun | G07C 5/008 701/1 |
| 2004/0198466 A1* | 10/2004 | Walby | G06F 1/3209 455/574 |
| 2008/0102854 A1* | 5/2008 | Yi | H04L 29/12283 455/456.1 |
| 2010/0036560 A1* | 2/2010 | Wright | B60R 16/037 701/36 |
| 2010/0115505 A1* | 5/2010 | Touati | G07C 5/008 717/171 |
| 2010/0159869 A1* | 6/2010 | Bradburn | G08B 21/0415 455/404.1 |
| 2010/0228404 A1* | 9/2010 | Link, II | G06F 9/44542 701/1 |
| 2011/0010389 A1* | 1/2011 | Shaffer | G06Q 10/10 707/770 |
| 2011/0125363 A1* | 5/2011 | Blumer | G06Q 30/06 701/31.4 |
| 2011/0144980 A1* | 6/2011 | Rysenga | G06Q 10/109 704/201 |
| 2011/0153148 A1* | 6/2011 | Edwards | G07C 5/008 701/29.5 |
| 2011/0171900 A1* | 7/2011 | Habermas | H04B 7/18523 455/3.02 |
| 2011/0281562 A1* | 11/2011 | Videtich | H04W 4/046 455/414.1 |
| 2012/0041635 A1* | 2/2012 | Johnson | G07C 5/008 701/31.4 |
| 2012/0071140 A1* | 3/2012 | Oesterling | H04W 4/12 455/414.1 |
| 2012/0244850 A1* | 9/2012 | Doherty | H04L 61/157 455/418 |

(Continued)

*Primary Examiner* — Ayaz Sheikh
*Assistant Examiner* — Faiyazkhan Ghafoerkhan

(57) ABSTRACT

A network device associates a fleet vehicle with a driver of it. The network device receives customer input associating a group of media access control (MAC) addresses of portable devices with driver identifiers and stores, in a memory, the MAC addresses associated with the driver identifiers. The network device also receives, from a vehicle telematics unit, a vehicle identifier of a vehicle connected to the vehicle telematics unit and a MAC address of a particular portable device proximate the vehicle. Based on the MAC address of the particular portable device, the network device associates a particular driver identifier and the vehicle identifier. The vehicle telematics unit may determine that driver is no longer driving when it can no longer detect a signal from the particular portable device that was proximate the vehicle.

20 Claims, 7 Drawing Sheets

(56) References Cited

U.S. PATENT DOCUMENTS

| | | | | |
|---|---|---|---|---|
| 2012/0253548 A1* | 10/2012 | Davidson | ............... | G06Q 10/08 701/1 |
| 2012/0253632 A1* | 10/2012 | Davidson | ............... | G06Q 10/08 701/99 |
| 2012/0289217 A1* | 11/2012 | Riemer | ............ | H04M 1/72577 455/418 |
| 2012/0303392 A1* | 11/2012 | Depura | ............ | H04W 52/0258 705/4 |
| 2013/0151027 A1* | 6/2013 | Petrucci | ................ | B60R 16/037 701/1 |
| 2013/0157647 A1* | 6/2013 | Kolodziej | ......... | H04M 1/72522 455/419 |
| 2013/0166104 A1* | 6/2013 | Creguer | ................ | B60R 25/245 701/2 |
| 2013/0166138 A1* | 6/2013 | Yun | ...................... | G07C 5/0841 701/32.6 |
| 2013/0226441 A1* | 8/2013 | Horita | ...................... | B60Q 9/00 701/118 |
| 2013/0231052 A1* | 9/2013 | Eling | .................. | H04L 63/0876 455/41.2 |
| 2013/0282717 A1* | 10/2013 | Kameyama | ........ | G01C 21/3608 707/736 |
| 2014/0195106 A1* | 7/2014 | McQuade | ............ | G07C 5/0841 701/33.9 |
| 2014/0278840 A1* | 9/2014 | Scofield | .................. | G07C 5/008 705/13 |
| 2014/0279707 A1* | 9/2014 | Joshua | ............... | G06Q 30/0283 705/400 |
| 2014/0309806 A1* | 10/2014 | Ricci | ........................ | B60Q 1/00 701/1 |
| 2014/0309813 A1* | 10/2014 | Ricci | ........................ | B60Q 1/00 701/2 |
| 2014/0309874 A1* | 10/2014 | Ricci | ........................ | G06F 21/31 701/36 |
| 2014/0309877 A1* | 10/2014 | Ricci | ..................... | H04W 48/04 701/36 |
| 2014/0309879 A1* | 10/2014 | Ricci | ..................... | H04W 48/04 701/36 |
| 2014/0323113 A1* | 10/2014 | Cho | ........................ | H04L 67/34 455/418 |

* cited by examiner

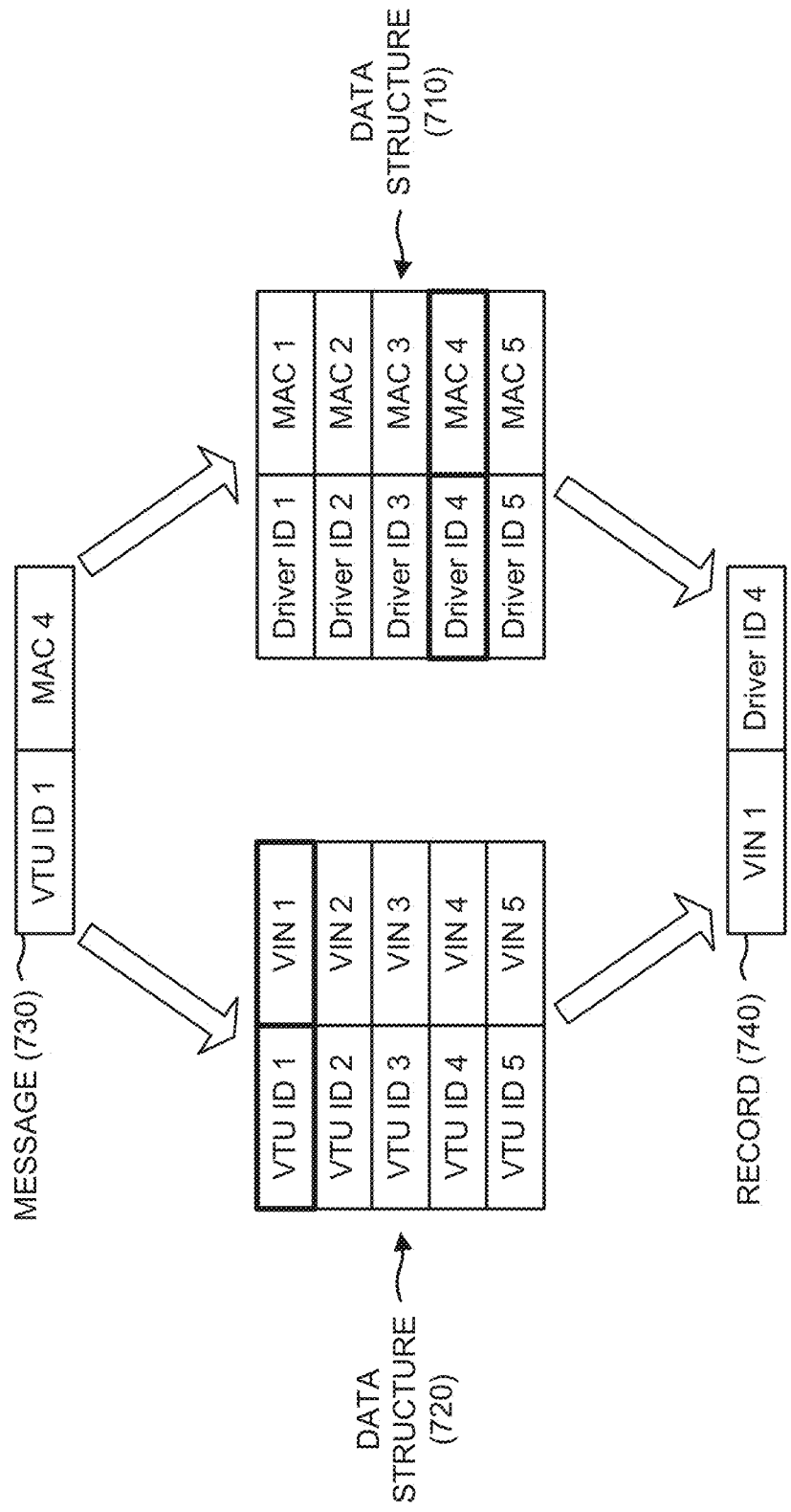

VEHICLE DRIVER IDENTIFICATION USING PORTABLE DEVICE

BACKGROUND

Vehicle manufacturers are required to install on-board diagnostic (e.g., OBD-II) systems on light-duty automobiles and trucks. On-board diagnostic systems monitor a vehicle's electrical and mechanical systems and generate data that can be processed by a vehicle's engine control unit (ECU) to detect any malfunction or deterioration in the vehicle's performance. Most ECUs transmit status and diagnostic information over a shared, standardized electronic bus in the vehicle. The bus effectively functions as an on-board computer network, with many processors transmitting and receiving data via the bus. Data available from the ECU may include vehicle speed, fuel level, engine temperature, intake manifold pressure, etc.

BRIEF DESCRIPTION OF THE DRAWINGS

FIG. 7 is an illustration of an exemplary association process described in FIG. 6.

DETAILED DESCRIPTION

Figure 1:
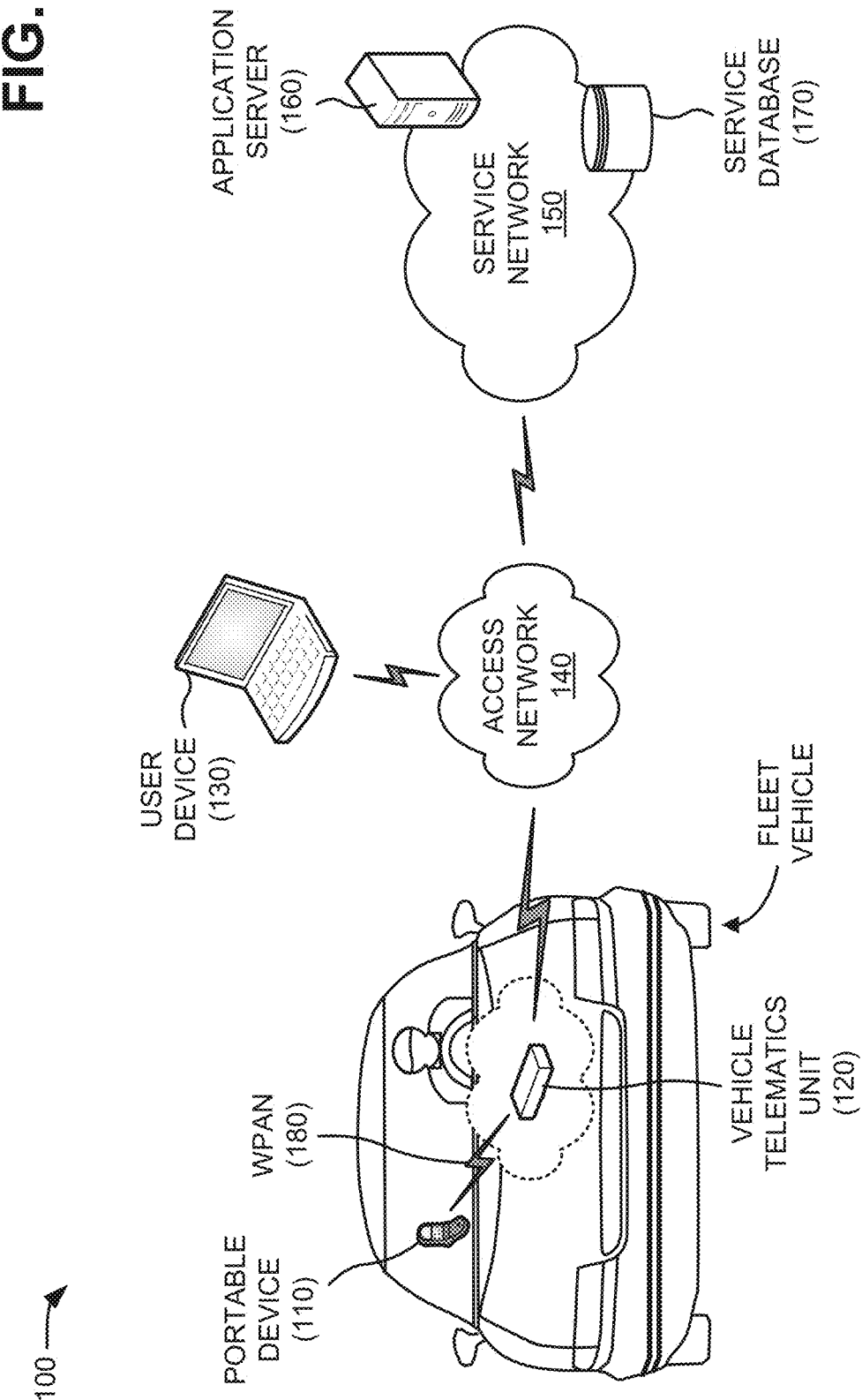
FIG. 1 depicts an exemplary network environment in which systems and/or methods described herein may be implemented.

The following detailed description refers to the accompanying drawings. The same reference numbers in different drawings may identify the same or similar elements.

While on-board diagnostic systems provide data for a particular vehicle, these systems do not associate the data with a particular driver. In fleet management systems, it is desirable to match on-board diagnostic data with the driver using the particular vehicle. However, current methods to match a driver with vehicle on-board diagnostic data typically require drivers to carry special equipment and/or perform additional registration actions.

Systems and methods described herein may use a wireless device, such as a Bluetooth™-enabled portable device, to uniquely identify drivers of fleet vehicles. A media access control (MAC) address of a portable device may be registered with a fleet management system to associate a driver with the portable device. Each fleet vehicle may include a vehicle telematics unit that may be equipped with a Bluetooth interface to discover the portable device when the portable device (e.g., set in discoverable mode) is located in the vehicle. The vehicle telematics unit may detect the MAC address (or another discoverable unique identifier) of the portable device and may transmit the MAC address to the fleet management system, where the MAC address may be paired with the registered driver. The system and methods may thus passively (e.g., without a particular action from the driver) associate the driver with the fleet vehicle in order to support operational processes and metrics.

In one implementation, a method of passively pairing a fleet vehicle with a driver is performed by a network device. The network device receives customer input associating a group MAC addresses of portable devices with driver identifiers and stores, in a memory, the MAC addresses associated with the driver identifiers. The network device also receives, from a vehicle telematics unit, a vehicle identifier of a vehicle connected to the vehicle telematics unit and a MAC address of a particular portable device. Based on the MAC address of the particular portable device, the network device associates a particular driver identifier and the vehicle identifier.

In another implementation, a vehicle telematics unit may include a memory to store a plurality of instructions, a wireless transceiver to receive discovery signals for a wireless personal area network; a wireless transceiver to transmit signals over a radio access network that is different than the wireless personal area network; and a processor. The processor may be configured to execute instructions in the memory to detect, via the discovery signals for the wireless personal area network, a MAC address of a portable device, and send, via the radio access network and to a network device of a fleet management system, the detected MAC address.

As used herein, the term "portable device" may generally refer to a consumer electronics device that provides local wireless connectivity with or without access to broadband cellular service. As used herein, the term "driver" may refer to a portable device user and/or one who brings a portable device into a fleet vehicle. As used herein, the term "customer" may refer to an entity that receives driver/vehicle tracking services from a service provider. As used herein the term "user" may refer particularly to an operator of a customer user device or, in some contexts, an operator of any type of device.

FIG. 1 is an exemplary network environment 100 in which systems and/or methods described herein may be implemented. As illustrated, network environment 100 may include a portable device 110, a vehicle telematics unit 120, a user device 130, an access network 140, a service network 150, an application server 160, a service database 170, and a wireless personal area network (WPAN) 180. Devices and/or networks of network environment 100 may interconnect via wired and/or wireless links.

Portable device 110 may include a radiotelephone, a personal communications system (PCS) terminal (e.g., that may combine a cellular radiotelephone with data processing and data communications capabilities), a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, a portable media player, a consumer electronics device, or other types of computation or communication devices. In an exemplary implementation, portable device 110 may be capable of communicating via a local wireless network, such as WPAN 180. In implementations described herein, portable device 110 may employ one or more short-range wireless communication standards for WPAN 180. Portable device 110 may employ, for example, IEEE 802.15 (e.g., Bluetooth) discovery protocols or Bluetooth-derivative protocols, although other local wireless network protocols that enable passive device discovery may be used.

Vehicle telematics unit 120 may include a data collection system, configured for installation in a vehicle, that receives data generated by vehicle sensors and/or a vehicle electronic control unit (ECU). Vehicle telematics unit 120 may include a device that is capable of communicating over access network 140 and/or service network 150. Vehicle telematics unit 120 may also be capable of communicating with portable device 110 via a short-range wireless network (e.g., WPAN 180). In implementations described herein, vehicle telematics unit 120 may receive information from portable device 110, vehicle sensors, and/or the ECU and may transmit the information to service network 150 via access network 140.

User device 130 may include a computational or communication device. User device 130 may enable a user to send/receive messages, view content, and/or interact with other devices. For example, user device 130 may include a personal computer (e.g., a laptop or desktop PC), a tablet computer, a smart phone, or other types of computational or communication devices that can communicate with devices in service network 150. In one implementation, user device 130 may include a web browser or other software to enable user device 130 to access web sites or other information from application server 160.

Access network 140 may include a communications network that connects subscribed devices (e.g., vehicle telematics unit 120, user device 130, etc.) and devices in service network 150. Access network 140 may generally include a local area network (LAN), a wide area network (WAN), a metropolitan area network (MAN), a wireless network, an optical fiber (or fiber optic) network, or a combination of networks. In one implementation, access network 140 may include an IP-based network. In some implementations, access network 140 may be a private network controlled by, for example, a telecommunications company that provides telephone and/or data access to vehicle telematics unit 120. In another implementation, access network 140 may be a public network, such as the Internet, or a combination of public and private networks. Generally, access network 140 may include at least one radio access network capable of supporting wireless communications to/from vehicle telematics unit 120. The radio access network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or a network implemented in accordance with future wireless access network standards.

Service network 150 may include network devices (e.g., application server 160, service database 170, and other devices) that provide a backend support system for facilitating fleet vehicle management, including vehicle driver identification. Service network 150 may include, for example, one or more private Internet Protocol (IP) networks that use a private IP address space. Service network 150 may include a local area network (LAN), an intranet, a private wide area network (WAN), etc. In one implementation, service network 150 may implement one or more virtual private networks (VPNs) for providing communication between devices within service network 150. Service network 150 may be protected/separated from other networks, such as access network 140, by a firewall. Although shown as a single element in FIG. 1, service network 150 may include a number of separate networks.

Application server 160 may include one or more server devices, or other types of computation or communication devices that gather, process, search, and/or provide information in a manner described herein. In one exemplary implementation, application server 160 may receive data from vehicle telematics unit 120 and/or user device 130 and store the information in service database 170. For example, application server 160 may receive a MAC address registration from user device 130 and/or a MAC address identification from vehicle telematics unit 120. In another implementation, application server 160 may retrieve information from service database 170 (e.g., in response to a query from user device 130) and provide the information to user device 130. Application server 160 may be a distributed component.

In one example, application server 160 may provide, to user device 130, a web page to manage registration and storage of MAC addresses (or other unique identifiers) that are associated with a portable device 110 and/or a fleet vehicle driver. For example, application server 160 may provide an entry point for secure web portal for customers. Additionally, or alternatively, application server 160 may provide a web-based application that user device 130 may use to submit the MAC addresses of portable devices and the vehicle driver identifiers. In still another implementation, the web-based application may include a utility to automatically detect MAC addresses of discoverable portable devices 110 and selectively populate the MAC addresses into the user interface of user device 130 (e.g., for eventual submission to application server 160).

Service database 170 may include a database or another data structure to store data pertaining to a fleet management system. Service database 170 may store, for example, driver registration information (e.g., driver ID, MAC address, etc.), vehicle registration information, and historical data for fleet vehicle inquiries. In an exemplary implementation, service database 170 may include one data set for input (e.g., from user device 130) associating MAC addresses with driver identifiers and another data set for input (e.g., from vehicle telematics unit 120) associating a vehicle telematics unit identifier with a vehicle identifier. Service database 170 may also include historical records for tracked fleet drivers and/or fleet vehicles.

WPAN 180 may employ one or more short-range wireless communication standards for a wireless personal area network, such as a wireless connection with portable device 110. WPAN 180 may use, for example, IEEE 802.15 (e.g., Bluetooth) standards or standards deriving therefrom. In another implementation, WPAN 180 may use different standards and/or protocols to implement a short range wireless communication with portable device 110.

In FIG. 1, the particular arrangement and number of components of network environment 100 are illustrated for simplicity. In practice there may be more portable devices 110, vehicle telematics units 120, user devices 130, access networks 140, service networks 150, application servers 160, service databases 170, and/or WPANs 180. For example, there may be thousands of portable devices 110 and/or vehicle telematics units 120.

Figure 2:
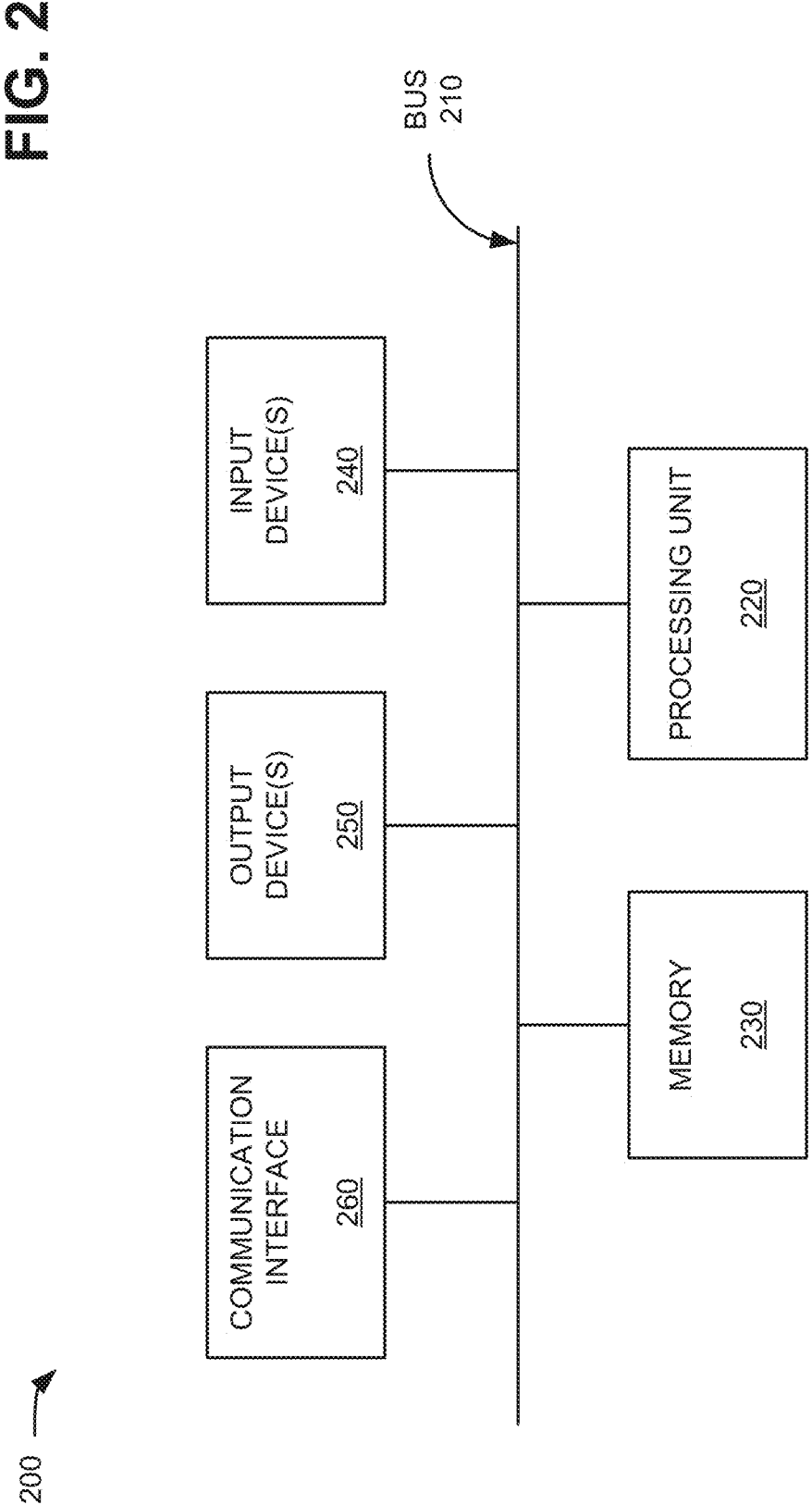
FIG. 2 is a diagram of exemplary components of a device that may correspond to a portable device, a user device, or an application server of the network depicted in FIG. 1.

FIG. 2 is a diagram illustrating exemplary components of a device 200. Each of portable device 110, user device 130, and application server 160 may be implemented/installed as a combination of hardware and software on one or more of devices 200. As shown in FIG. 2, device 200 may include a bus 210, a processing unit 220, a memory 230, one or more input devices 240, one or more output devices 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits a user to input information to device 200, such as a keyboard, a keypad, a mouse, a pen, a microphone, one or more biometric mechanisms, and the like. Output device 250 may include a device that outputs information to the user, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network environment 100. In one implementation, communications interface 260 may support short range wireless network communications (e.g., via Bluetooth protocols). In another implementation, communications interface 260 may support long range wireless network communications (e.g., cellular network services). In other implementations, communication interface 260 may support other wired or wireless network communications.

As described herein, device 200 may perform certain operations in response to processing unit 220 executing software instructions stored in a computer-readable medium, such as memory 230. A computer-readable medium may include a non-transitory tangible memory device. A memory device may be implemented within a single physical memory device or spread across multiple physical memory devices. The software instructions may be read into memory 230 from another computer-readable medium or read into memory 230 from another device via communication interface 260. The software instructions stored in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than those depicted in FIG. 2. As an example, in some implementations, a display may not be included in device 200. In these situations, device 200 may be a "headless" device that does not include input device 240. Alternatively, or additionally, one or more components of device 200 may perform one or more other tasks described as being performed by one or more other components of device 200.

Figure 3:
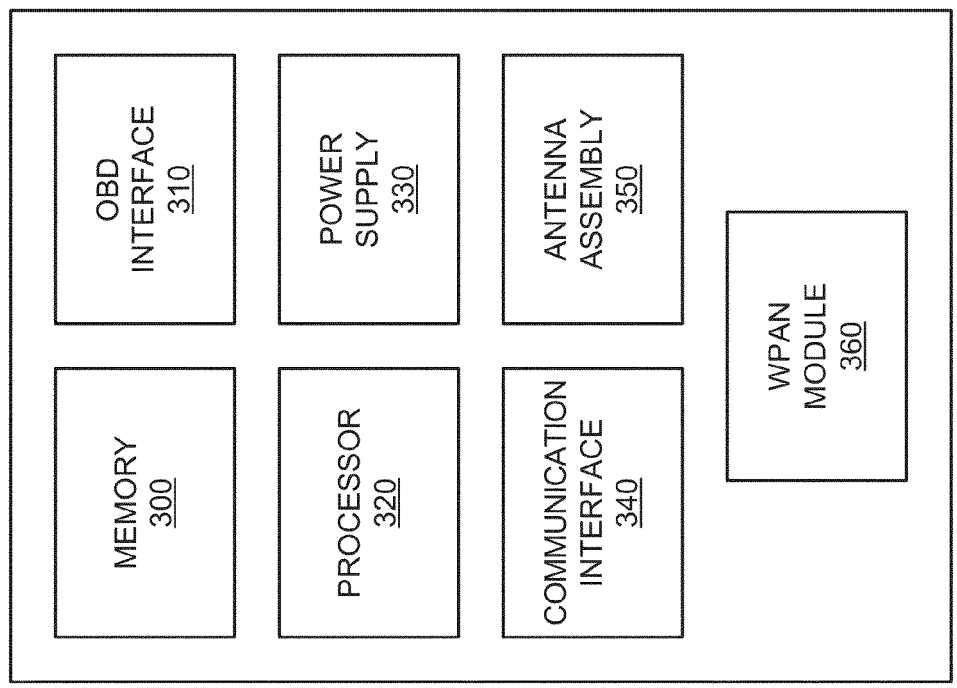
FIG. 3 is a diagram of exemplary components of a vehicle telematics unit of the network depicted in FIG. 1.

FIG. 3 is a block diagram of exemplary components of vehicle telematics unit 120. As shown in FIG. 3, vehicle telematics units 120 may include a memory 300, an OBD interface 310, a processor 320, a power supply 330, a communication interface 340, an antenna assembly 350, and a WPAN module 360.

Memory 300 may include a RAM, a ROM, and/or another type of memory to store data and instructions that may be used by processor 320.

OBD interface 310 may include a physical connector interface for use with a vehicle's on-board diagnostic systems. For example, OBD interface 310 may be configured to receive diagnostic and/or control information from a vehicle's ODB-II system or another on-board diagnostic system protocol. In one implementation, OBD interface may also receive power from the vehicle (e.g., a vehicle battery) to run vehicle telematics unit 120. Vehicle telematics unit 120 may also be directly coupled to the vehicle's communication bus, such as when a vehicle manufacturer installs the telematics unit when assembling the vehicle. In such installations, vehicle telematics unit 120 does not need to couple via an OBD-II connector.

Processor 320 may include one or more processors, microprocessors, application specific integrated circuits (ASICs), field programmable gate arrays (FPGAs), or other processing logic. Processor 320 may control operation of vehicle telematics unit 120 and its other components.

Power supply 330 may include one or more batteries or other power source components used to supply power to components of vehicle telematics unit 120. Power supply 330 may also include control logic to control application of power from an external power source (e.g., a vehicle battery) to one or more components of vehicle telematics unit 120.

Communication interface 340 may include a logical component that includes input and/or output ports, input and/or output systems, and/or other input and output components that facilitate the transmission of data to/from other devices. For example, communication interface 340 may include a network interface card (e.g., Ethernet card) for wired communications and/or a wireless network interface card for wireless communications. Communication interface 240 may also include WPAN interface. The WPAN interface may include a Bluetooth interface or another wireless interface that allows vehicle telematics unit 120 to "pair up" and communicate wirelessly with other devices, such as portable devices 110 that includes a Bluetooth interface. In another implementation, the WPAN interface may detect WPAN discovery signals from portable device 110 (e.g., when portable device 110 is in "discoverable" mode and proximate the vehicle) without actually pairing up. In other implementations, communication interface may also include a universal serial bus (USB) port for communications over a cable, a radio-frequency identification (RFID) interface, a near-field communications (NFC) wireless interface, and/or any other type of interface that converts data from one form to another form.

Antenna assembly 350 may include one or more antennas to transmit and/or receive RF signals over the air. Antenna assembly 350 may, for example, receive RF signals from communication interface 340 and transmit the signals over the air and receive RF signals over the air and provide them to communication interface 340.

WPAN module 360 may include a logical component to support device MAC address discovery. In other implementations, WPAN module may be included as part of processor 320. Based on device discovery information received via communication interface 340, WPAN module 360 may monitor the activity of Bluetooth-enabled devices within signal range of vehicle telematics unit 120. For each Bluetooth-enabled device, WPAN module 360 may detect, for example, a Bluetooth address (e.g., a MAC address), a first detection time, and a last detection time. In other implementations, WPAN module 360 may also detect a device name, a device type, and/or other information.

Although FIG. 3 shows exemplary components of vehicle telematics unit 120, in other implementations, vehicle telematics unit 120 may include fewer components, different components, differently-arranged components, or additional components than those depicted in FIG. 3. Alternatively, or additionally, one or more components of vehicle telematics unit 120 may perform one or more other tasks described as being performed by one or more other components of vehicle telematics unit 120.

Figure 4:
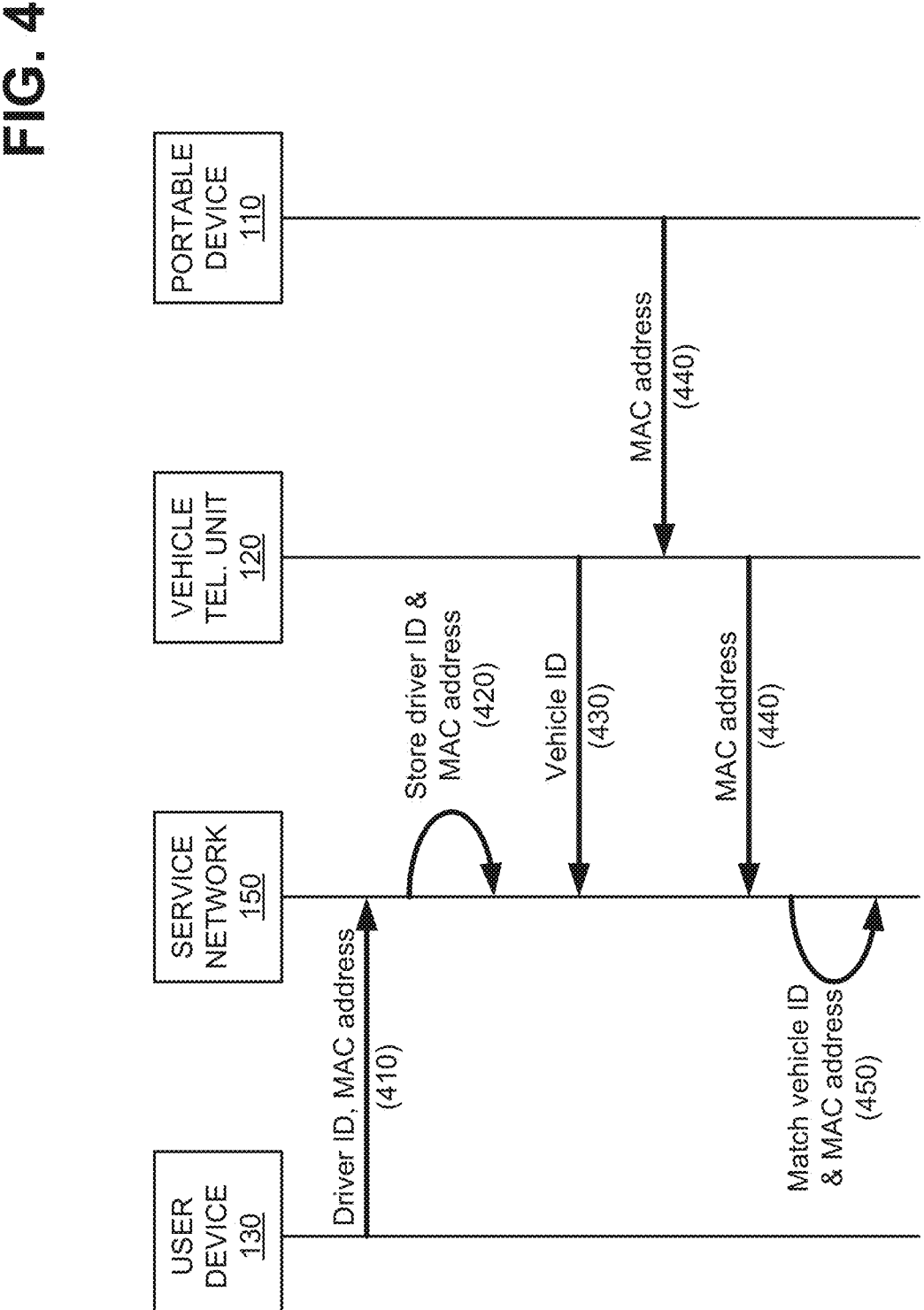
FIG. 4 is a diagram of exemplary communications among devices in a portion of the network of FIG. 1.

FIG. 4 is a diagram of exemplary communications among components of a portion 400 of network environment 100 according to an implementation described herein. Communications in FIG. 4 may illustrate process for associating a driver with a fleet vehicle. As shown in FIG. 4, network portion 400 may include portable device 110, vehicle telematics unit 120, user device 130, and service network 150.

A user (e.g., a fleet network technician) may solicit a MAC address for a portable device 110 associated with a particular driver. In one implementation, the MAC address may be manually obtained by accessing a settings screen on portable device 110 or by viewing the MAC address from a physical location (e.g., inside a battery cover) on portable device 110. In another implementation, user device 130 may be used to discover the MAC address of portable device 110. In an exemplary implementation, user device 130 may be equipped with a Bluetooth interface and a utility application to detect information (including a MAC address) from discoverable Bluetooth-enabled devices. A driver identifier (ID) may be associated with the MAC address as a single data record. The driver identifier may include, for example, a driver name (or portion thereof), an employee number, or another unique identifier.

As indicated by reference number 410, user device 130 may send the driver identifier and device MAC address to service network 150. For example, in one implementation, user device 130 may access a secure web portal through application server 160 that enables user device 130 to upload data into service database 170. Alternatively, user device 130 may store the driver identifier and device MAC address locally (e.g., in memory 230 or in another local network memory) and send only the MAC address to service network 150.

Service network 150 may receive the driver identifier and device MAC address. As indicated by reference 420, service network 150 may store the driver identifier and device MAC address (e.g., in service database 170).

Vehicle telematics unit 120 may transmit a vehicle identifier (ID) 430 to service network 150. For example, vehicle telematics unit 120 may retrieve a vehicle identification number (VIN) or another vehicle identifier via OBD interface 310. Vehicle telematics unit 120 may forward vehicle identifier 430 to application server 160 or service database 170 on a continuous basis, a periodic basis, or an event-driven basis (e.g., when a vehicle is turned on/off).

As directed, for example, by company policy, a driver may be required to carry a Bluetooth-enabled device (e.g., portable device 110) that is set to a discoverable mode during a driver's working period. When a driver (with portable device 110) enters and/or starts a fleet vehicle, vehicle telematics unit 120 may retrieve a MAC address 440 from portable device 110. In one implementation, portable device 110 may transmit MAC address 440 as part of device information according to known Bluetooth discovery protocols. Thus, vehicle telematics unit 120 may receive MAC address 440 without performing an actual pairing procedure with portable device 110.

Upon receiving MAC address 440, vehicle telematics unit 120 may forward MAC address 440 to service network 150 (e.g., via access network 140). For example, in one implementation, communication interface 340 of vehicle telematics unit 120 may transmit MAC address 440, along with an identifier of vehicle telematics unit 120 and/or vehicle identifier 430, via cellular, satellite, or WAN network link.

Service network 150 may receive MAC address 440 and may match the MAC address with the corresponding vehicle identifier, as indicated by reference number 450. For example, application server 160 may receive MAC address 440 and, based on the identifier of vehicle telematics unit 120 and/or vehicle identifier 430, may match MAC address 440 to the current fleet vehicle being operated by the driver with portable device 110. In one implementation, application server 160 may match the MAC address to a driver identifier. Additionally, application server 160 may log the MAC address and/or driver identifier in service database 170 with additional vehicle data. For example, vehicle activity, such as speed, acceleration, deceleration, routes, gas mileage, etc., may be logged to the particular driver for as long as the driver is in the vehicle. Logged data may include, for example, real-time and/or historical parameters.

In one implementation, service network 150 may receive multiple MAC addresses from a single vehicle telematics unit 120 (e.g., indicative of multiple portable devices 110 in a particular fleet vehicle). Service network 150 (e.g., application server 160) may determine if any of the multiple MAC addresses are associated with a particular driver identifier in database 170. If the multiple MAC addresses can be associated with only a single driver identifier, service network 150 (e.g., application server 160) may discard unrecognized MAC addresses. If the multiple MAC addresses can be associated with multiple driver identifiers, service network 150 (e.g., application server 160) may track vehicle data as associated with the multiple driver identifiers and/or MAC addresses. In an additional aspect, an application running on one or more of the portable devices 110 may perform an alert and request that a user select the MAC address associated with an individual actually driving, or otherwise operating, the vehicle. For example, if vehicle telematics unit 120 detects multiple MAC addresses, vehicle telematics unit 120 may pair with one or more of portable devices 110 to trigger the application on portable device 110 to solicit a driver device indication. Alternatively, vehicle telematics unit 120 may cause an interface (e.g., on a vehicle display or on vehicle telematics unit 120) to manifest for a user or operator of the vehicle to select a MAC address, or person, operating the vehicle.

Figure 5:
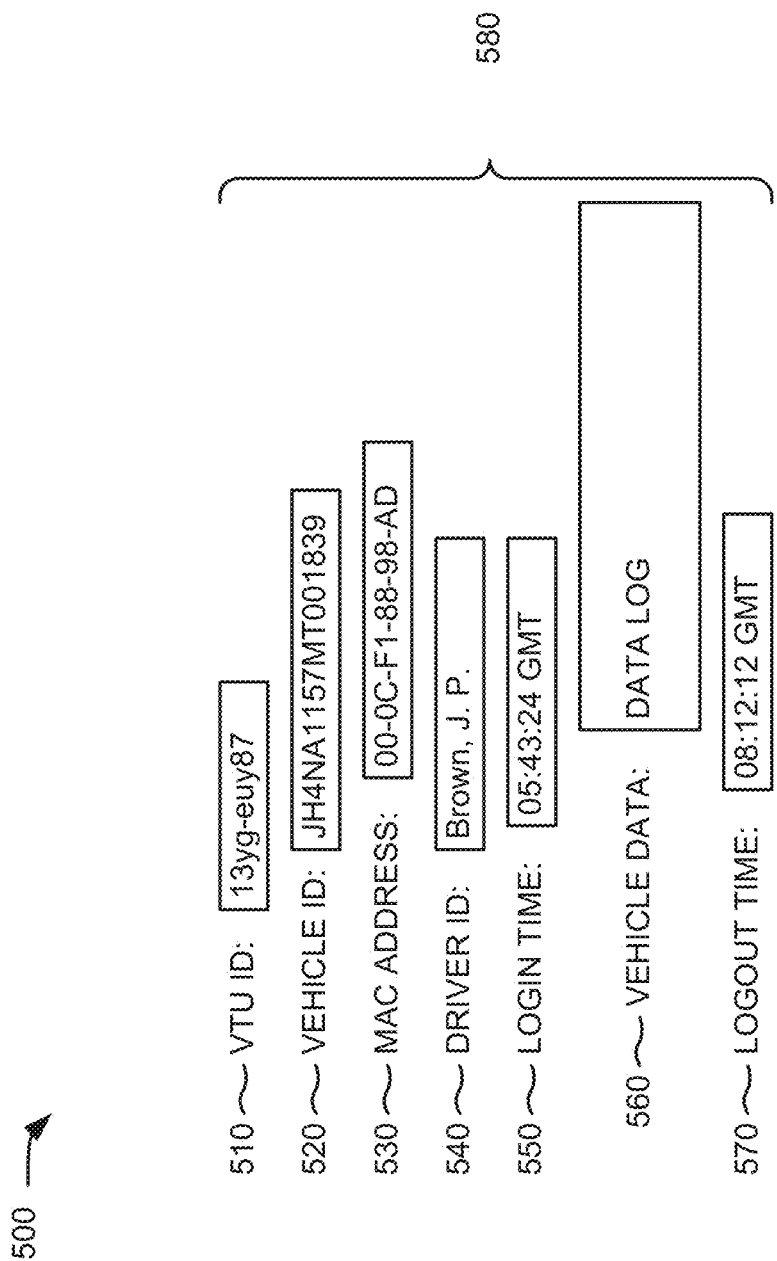
FIG. 5 is a diagram illustrating a portion of an exemplary data structure that may be provided by the application server from the service database, according to an implementation described herein.

FIG. 5 shows a diagram illustrating a portion of an exemplary data structure 500 that may be provided by application server 160 from service database 170. Data structure 500 may generally include records for associating fleet vehicle activity with a particular driver based on data provided from portable device 110, vehicle telematics unit 120, and user device 130. As shown in FIG. 5, data structure 500 may include a vehicle telematics unit (VTU) identifier (ID) field 510, a vehicle ID field 520, a MAC address field 530, a driver ID field 540, a login time field 550, a vehicle data field 560, a logout time field 570, and a variety of entries 580 for fields 510-570. The portion of data structure 500 shown in FIG. 5 may correspond to a single record for a particular driver/vehicle combination.

VTU ID field 510 may include a unique identifier (e.g., "13yg-euy87") for a vehicle telematics unit (e.g., vehicle telematics unit 120) providing data to service network 150. Vehicle ID field 520 may include a vehicle identification number (VIN) or another vehicle identifier of the vehicle to which vehicle telematics unit 120 is connected/installed.

MAC address field 530 may include the MAC address (e.g., "00-0C-F1-88-98-AD") of a portable device 110 that is detected by vehicle telematics unit 120. In one implementation, if MAC addresses from multiple devices are detected, MAC address field may include multiple MAC addresses in MAC address field 530.

Driver ID field 540 may include a name, an employee identification number, or other information to uniquely identify a fleet vehicle driver associated with a MAC address. For example, a driver name (e.g., "Brown, J. P.") may be inserted in driver ID field 540 based on information in MAC address field 530 and the stored driver ID and MAC address provided in FIG. 4 (ref. no. 420).

Login time field 550 may include a time that portable device 110 is initially associated with a vehicle. For example, login time field 550 may include a first detection time that vehicle telematics unit 120 (e.g., WPAN module 360) identifies a MAC address of portable device 110.

Vehicle data field 560 may include data that may be collected by vehicle telematics unit 120 and associated with a particular MAC address (e.g., from MAC address field 530) during a particular period (e.g., the interval between the times in login time field 550 and logout time field 570). Vehicle data field 560 may include, for example, speed, acceleration, deceleration, routes, gas mileage, and other vehicle activity.

Logout time 570 may include a time that portable device 110 is no longer associated with a vehicle. For example, logout time field 570 may include a first detection time that vehicle telematics unit 120 (e.g., WPAN module 360) identifies that portable device 110 is no longer discoverable by vehicle telematics unit 120. In one implementation, the logout time may be based on a threshold number of consecutive failed discovery attempts of portable device 110. In another implementation, the logout time may be based on detection of a different portable device 110.

Although FIG. 5 shows exemplary fields of data structure 500, in other implementations, data structure 500 may include different fields or additional fields than those depicted in FIG. 5. For example, in other implementations data structure 500 may include a individual record identifier or other information.

Figure 6:
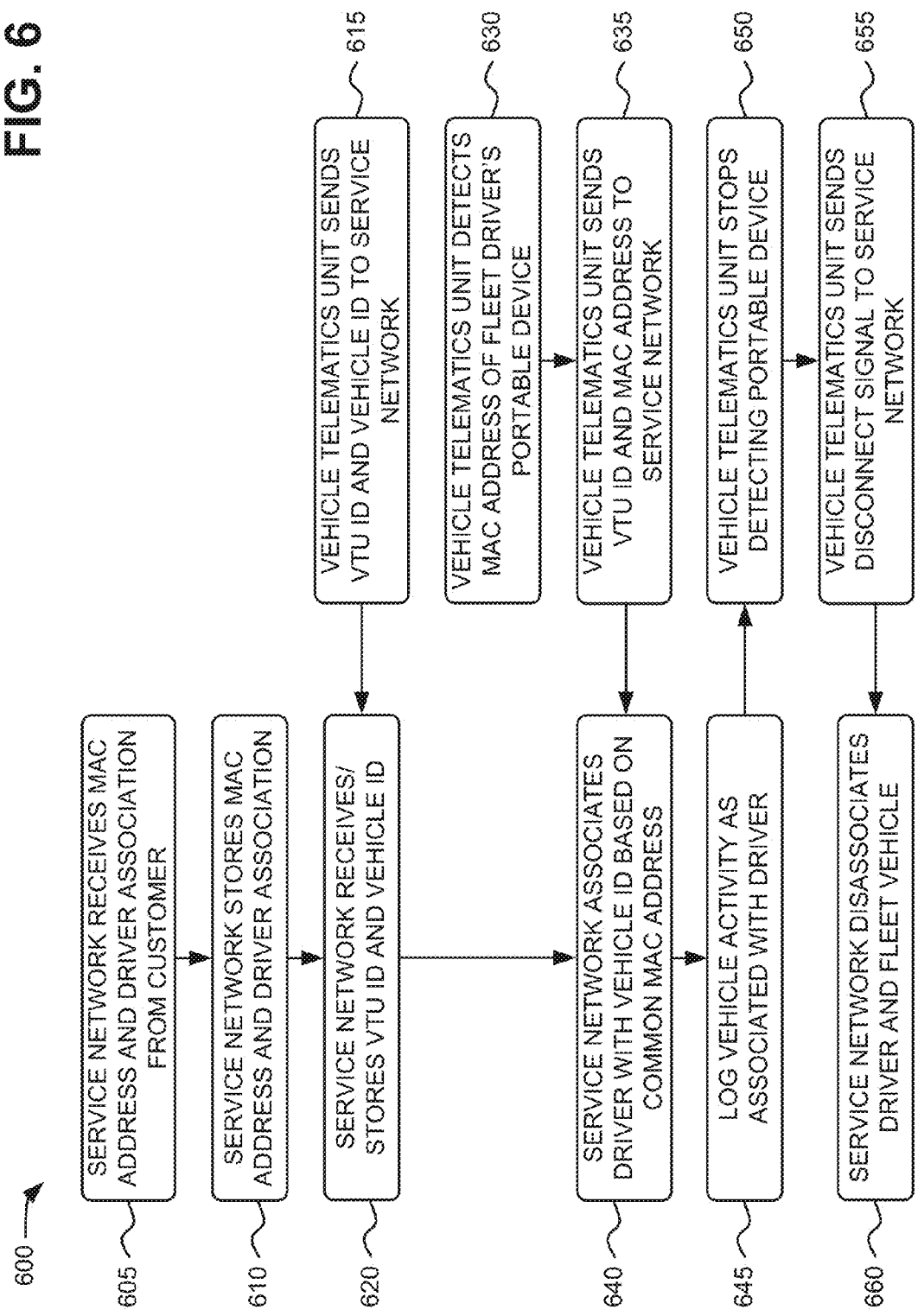
FIG. 6 is a flow chart of an exemplary process of associating a driver with a fleet vehicle according to an implementation described herein.

FIG. 6 is a flow chart of an exemplary process of associating a driver with a fleet vehicle according to an implementation described herein. In one implementation, process 600 may be performed by application server 160 and vehicle telematics unit 120. In other implementations, process 600 may be performed by one or more other devices of network environment 100, including or excluding vehicle telematics unit 120 and application server 160. Process 600 is described with reference to components in figures described above and the sample data in FIG. 7.

As shown in FIG. 6, process 600 may include a service network receiving a MAC address and driver association from a customer (block 605) and the service network storing the MAC address and driver association (block 610). For example, a customer may provide a MAC addresses with a driver identifier to application server 160. Application server 160 may receive the input from user device 130 and store the MAC addresses with the driver identifier in service database 170. In the example of FIG. 7, a customer may submit "Driver ID 4" associated with "MAC 4." As shown in FIG. 7, the MAC address and driver identifier (i.e., "MAC 4" and "Driver ID 4") may be stored with other driver identifiers and associated MAC addresses in a data structure 710.

Process 600 may also include the vehicle telematics unit sending a vehicle telematics unit identifier (VTU ID) and a vehicle identifier to the service network (block 615), and the service network receiving and storing the vehicle telematics unit identifier and the vehicle identifier (block 620). For example, vehicle telematics unit 120 may periodically transmit information to application server 160 to associate vehicle telematics unit 120 with a particular fleet vehicle. Application server 160 may receive the input from vehicle telematics unit 120 and store the vehicle telematics unit identifier and the vehicle identifier in service database 170. In the example of FIG. 7, vehicle telematics unit 120 may submit "VTU ID 1" associated with "VIN 1." As shown in FIG. 7, the vehicle telematics unit identifier and vehicle identifier may be stored with other vehicle telematics unit identifiers and associated vehicle identifiers in a data structure 720.

Also in process 600, the vehicle telematics unit may detect a fleet driver's portable device (block 630) and may send the vehicle telematics unit identifier (VTU ID) and the MAC address to the service network (block 635). For example, vehicle telematics unit 120 may detect, via discovery protocols for WPAN 180, the MAC address of portable device 110. Vehicle telematics unit 120 may send to application server 160, the detected MAC address along with the vehicle telematics unit identifier. As shown in FIG. 7, vehicle telematics unit 120 with an identifier of "VTU 1" may detect a portable device with a MAC address of "MAC 4" and may submit a message 730 associating "VTU ID 1" with "MAC 4."

Process 600 may further include the service network associating the driver with the vehicle identifier based on the common MAC address (block 640), and logging vehicle activity as associated with the driver (block 645). For example, application server 160 may perform a lookup of the MAC address received from vehicle telematics unit 120 against the previously stored MAC addresses (e.g., as received from the customer via user device 130) in service database 170. Assuming a match is found, application server 160 may associate the particular driver identifier and the vehicle identifier. As shown in FIG. 7, for example, application server 160 may perform a lookup of "MAC 4" in data structure 710 and a lookup of "VTU ID 1" in data structure 720. Based on the lookups, application server 160 may associate "Driver ID 4" with "VIN 1" in record 740.

Process 600 may also include the vehicle telematics unit failing to detect the portable device (block 650), the vehicle telematics unit sending a disconnect signal to the service network (block 655), and the service network disassociating the driver and the fleet vehicle (block 660). For example, vehicle telematics unit 120 may detect that a MAC address (or other discovery information) of portable device 110 is not available for at least a threshold period and/or that another MAC address of another portable device 110 is discoverable. Vehicle telematics unit 120 may send the updated MAC address status to application server 160. Application server 160 may receive the updated MAC address status and may disassociate the driver/vehicle record. For example, referring to FIG. 7, application server 160 may disassociate "Driver ID 4" with "VIN 1" in record 740.

In systems and methods described herein, a driver and a fleet vehicle may be passively or seamlessly paired based on stored association of a driver with a particular MAC address. The network device may receive customer input to associate a group of media access control (MAC) addresses of portable devices with driver identifiers and may store, in a memory, the MAC addresses associated with the driver identifiers. The network device may also receive, from a vehicle telematics unit, a vehicle identifier of a vehicle connected to the vehicle telematics unit and a MAC address of a particular portable device. Based on the MAC address of the particular portable device, the network device may associate the driver identifier and the vehicle identifier.

The systems and methods described herein may permit real-time association of a driver and a fleet vehicle. The systems and methods may enable passive detection of any Bluetooth-enabled device, such as a driver's cellular phone, so that separate driver equipment, such as RFID cards or key fobs, is not required. Non-paired discovery of the driver's portable device can be performed in a way that does count against a pair connection limit and does not limit other uses of the portable device.

Various preferred embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, in another implementation, service network 150 may associate a MAC address and a particular vehicle identifier. Application server 160 may provide the MAC address and driver association to, for example, user device 130. Thus, a customer may locally pair a driver identifier based on the MAC address without having to transmit a separate driver identifier to application server 160.

In another implementation, vehicle telematics unit 120 may transmit a vehicle identifier as part of signaling a MAC address discovery. Thus, application server 160 may match a driver to a vehicle identifier by simply matching the discovered MAC address to previously stored MAC address/driver association identifier.

Also, while a series of blocks has been described with respect to FIG. 6, the order of the blocks may be modified in other implementations. Further, non-dependent blocks may be performed in parallel. For example, in another implementation, application server 160 may log vehicle data associated with a MAC address and provide particular driver associations at a later time.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    receiving, by a network device, customer input associating a plurality of media access control (MAC) addresses of portable devices with driver identifiers;
    storing, by the network device and in a memory, the MAC addresses associated with the driver identifiers;
    receiving, by the network device and from a vehicle telematics unit, a vehicle identifier of a vehicle connected to the vehicle telematics unit;
    receiving, by the network device and from the vehicle telematics unit, a MAC address of a particular portable device;
    associating, by the network device and based on the MAC address of the particular portable device, a particular driver identifier and the vehicle identifier;
    receiving, by the network device and from the vehicle telematics unit, a signal indicating that the particular portable device is no longer discoverable by the vehicle telematics unit; and
    disassociating, by the network device and in response to receiving the signal, the particular vehicle driver and the vehicle identifier.

2. The method of claim 1, further comprising:
    detecting, by the vehicle telematics unit and via discovery protocols for a wireless personal area network, the MAC address of the particular portable device; and
    sending, by the vehicle telematics unit and to the network device, the detected MAC address.

3. The method of claim 2, wherein the detecting the MAC address of the particular portable device includes:
    identifying the particular portable device based on discovery information provided by the particular portable device according to Bluetooth protocols.

4. The method of claim 3, wherein the detecting of the MAC address of the particular portable device is conducted without pairing the vehicle telematics unit and the particular portable device.

5. The method of claim 2, wherein the sending the detected MAC address includes sending the MAC address via a radio access network that is different than the wireless personal area network.

6. The method of claim 1, wherein the associating the particular driver identifier and the vehicle identifier includes:
    performing a lookup of the MAC address and the particular driver identifier in the memory.

7. The method of claim 1, further comprising:
    providing, by the network device, a user interface to receive the customer input.

8. The method of claim 7, wherein providing the user interface includes one or more of:
    providing a secure web-page to submit the MAC addresses of portable devices and the driver identifiers, or
    providing a web-based application to submit the MAC addresses of portable devices and the vehicle driver identifiers.

9. The method of claim 8, wherein the web-based application includes a utility to automatically detect MAC addresses of discoverable portable devices and selectively populate the MAC addresses into the user interface.

10. The method of claim 1, further comprising:
    receiving, by the network device and from the vehicle telematics unit, vehicle activity data; and
    associating the vehicle activity data with the particular driver identifier.

11. The method of claim 1, further comprising:
    detecting that the particular portable device is no longer discoverable by the vehicle telematics unit; and
    sending, by the vehicle telematics unit, the signal indicating that the particular portable device is no longer discoverable by the vehicle telematics unit.

12. The method of claim 11, wherein the detecting that the particular portable device is no longer discoverable by the vehicle telematics unit includes one or more of:
    detecting that a MAC address of the particular portable device is not available for at least a threshold period, or
    detecting that a MAC address of the particular portable device is not available and detecting another MAC address of another portable device.

13. The method of claim 1, further comprising:
    storing, by the network device, a vehicle telematics unit identifier with the vehicle identifier; and
    performing, by the network device, a lookup of the vehicle identifier based on the vehicle telematics unit identifier.

14. A system, comprising:
    a vehicle telematics unit comprising:
    a memory to store a plurality of instructions,
    a first wireless transceiver to receive discovery signals via a wireless personal area network,
    a second wireless transceiver to transmit signals over a radio access network that is different than the wireless personal area network, and
    a processor configured to execute the instructions in the memory to:
        detect, via the discovery signals for the wireless personal area network, a media access control (MAC) address of a portable device,
        send, via the radio access network, the detected MAC address,
        detect that the MAC address is no longer discoverable by the vehicle telematics unit, and
        send, to the one or more network devices, a signal indicating that the portable device is no longer discoverable by the vehicle telematics unit; and
    one or more network devices comprising:
    one or more memories to store instructions, driver identifiers, and MAC addresses, and
    one or more processors configured to execute the instructions in the one or more memories to:
        receive input associating the MAC address with a driver identifier,
        receive input associating a vehicle telematics unit identifier with a vehicle identifier,
        receive, from the vehicle telematics unit, an indication that the MAC address has been detected by the vehicle telematics unit, wherein the indication includes the vehicle telematics unit identifier, and
        associate, based on the MAC address and the vehicle telematics unit identifier, the driver identifier and the vehicle identifier.

15. The system of claim 14, wherein the one or more processors of the one or more network devices are further configured to:
    store, in the one or more memories, the MAC addresses associated with the driver identifiers, and
    store, in the one or more memories, the vehicle telematics unit identifier with the vehicle identifier.

16. The system of claim 15, wherein, when associating the driver identifier and the vehicle identifier, the one or more processors of the one or more network devices are further configured to:
    perform a lookup of the driver identifier based on the MAC address in the one or more memories, and
    perform a lookup of the vehicle identifier based on the vehicle telematics unit identifier in the one or more memories.

17. The system of claim 14, wherein the processor of the vehicle telematics unit is further configured to:
    identify the MAC address of the portable device based on discovery information provided by the portable device according to Bluetooth protocols.

18. The system of claim 14, wherein the one or more processors of the one or more network devices are further configured to:
    provide, to a user device, a user interface to solicit the input associating each of the MAC addresses with a driver identifier.

19. A vehicle telematics unit, comprising:
    a memory to store a plurality of instructions;
    a first wireless transceiver to receive discovery signals via a wireless personal area network;
    a second wireless transceiver to transmit signals over a radio access network that is different than the wireless personal area network; and
    a processor configured to execute the instructions in the memory to:
        detect, via the discovery signals for the wireless personal area network, a media access control (MAC) address of a portable device,
        send, via the radio access network and to a network device of a fleet management system, the detected MAC address,
        detect that the MAC address is no longer discoverable by the vehicle telematics unit, and
        send, to the network device, a signal indicating that the portable device is no longer discoverable by the vehicle telematics unit.

20. The vehicle telematics unit of claim 19, wherein, when detecting the MAC address of the portable device, the processor is further configured to execute the instructions in the memory to:
    identify the MAC address of the portable device based on discovery information provided according to Bluetooth protocols.

* * * * *